(12) United States Patent
Van Hoof et al.

(10) Patent No.: US 7,822,270 B2
(45) Date of Patent: Oct. 26, 2010

(54) MULTIMEDIA COLOR MANAGEMENT SYSTEM

(75) Inventors: Hubert Van Hoof, Seattle, WA (US); Charles A Mauzy, Sammamish, WA (US); Michael D Stokes, Eagle, ID (US); Lavanya Vasudevan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1388 days.

(21) Appl. No.: 11/216,626

(22) Filed: Aug. 31, 2005

(65) Prior Publication Data

US 2007/0046958 A1 Mar. 1, 2007

(51) Int. Cl.
*G06K 9/00* (2006.01)

(52) U.S. Cl. ...................................... 382/167
(58) Field of Classification Search ................. 382/167
See application file for complete search history.

(56) References Cited

U.S. PATENT DOCUMENTS

| 5,107,332 | A | 4/1992 | Chan |
| 5,185,673 | A | 2/1993 | Sobol |
| 5,271,096 | A | 12/1993 | Cook |
| 5,280,344 | A | 1/1994 | Witlin et al. |
| 5,309,257 | A | 5/1994 | Bonino et al. |
| 5,313,291 | A | 5/1994 | Appel et al. |
| 5,377,000 | A | 12/1994 | Berends |
| 5,416,613 | A | 5/1995 | Rolleston et al. |
| 5,459,678 | A | 10/1995 | Feasey |
| 5,483,339 | A | 1/1996 | Van Aken et al. |
| 5,500,921 | A | 3/1996 | Ruetz |
| 5,537,516 | A | 7/1996 | Sherman et al. |
| 5,572,632 | A | * 11/1996 | Laumeyer et al. .......... 358/1.17 |
| 5,583,666 | A | 12/1996 | Ellson et al. |
| 5,701,175 | A | 12/1997 | Kostizak et al. |
| 5,704,026 | A | 12/1997 | Wan |

(Continued)

FOREIGN PATENT DOCUMENTS

EP  0539943  5/1993

(Continued)

OTHER PUBLICATIONS

PCT Search Report for PCT Application No. PCT/US2006/033822, mailed Jan. 9, 2007 (2 pages).

(Continued)

*Primary Examiner*—Bhavesh M Mehta
*Assistant Examiner*—Hadi Akhavannik
(74) *Attorney, Agent, or Firm*—Lee & Hayes, PLLC

(57) ABSTRACT

A color management system is described herein. Various embodiments of a method described herein can include receiving source color content that is associated with a source device, and transforming the source color content into destination color content for rendering on one or more destination devices. Various embodiments of an apparatus described herein can include a color infrastructure transformation engine that further includes a sequential transform component, which is adapted to receive source color content and to create a transform to facilitate mapping the source color content to destination color content. The color infrastructure transformation engine can also include a transform optimization component that is adapted to receive the transform and to create an optimized transform table based on the transform, and a transform execution component that is adapted to receive the optimized transform table and to generate the destination color content based thereon.

19 Claims, 11 Drawing Sheets

U.S. PATENT DOCUMENTS

| | | | |
|---|---|---|---|
| 5,757,536 | A | 5/1998 | Ricco et al. |
| 5,809,164 | A | 9/1998 | Hultgren, III |
| 5,864,364 | A | 1/1999 | Ohyama et al. |
| 5,905,571 | A | 5/1999 | Butler et al. |
| 5,999,319 | A | 12/1999 | Castracane |
| 6,001,488 | A | 12/1999 | Kataoka et al. |
| 6,023,557 | A | 2/2000 | Shaklee |
| 6,043,909 | A * | 3/2000 | Holub ........................ 358/504 |
| 6,157,735 | A | 12/2000 | Holub |
| 6,262,804 | B1 | 7/2001 | Friend et al. |
| 6,297,826 | B1 | 10/2001 | Semba et al. |
| 6,301,393 | B1 | 10/2001 | Spaulding et al. |
| 6,340,975 | B2 | 1/2002 | Marsden et al. |
| 6,373,595 | B1 | 4/2002 | Semba et al. |
| 6,400,843 | B1 | 6/2002 | Shu et al. |
| 6,411,304 | B1 | 6/2002 | Semba et al. |
| 6,416,153 | B1 | 7/2002 | Pan et al. |
| 6,459,425 | B1 | 10/2002 | Holub et al. |
| 6,525,721 | B1 | 2/2003 | Thomas et al. |
| 6,603,879 | B2 | 8/2003 | Haikin et al. |
| 6,618,499 | B1 | 9/2003 | Kohler et al. |
| 6,625,306 | B1 | 9/2003 | Marshall et al. |
| 6,646,762 | B1 | 11/2003 | Balasubramanian et al. |
| 6,681,041 | B1 | 1/2004 | Stokes et al. |
| 6,704,442 | B2 | 3/2004 | Haikin et al. |
| 6,754,384 | B1 | 6/2004 | Spaulding et al. |
| 6,766,263 | B1 | 7/2004 | Stokes |
| 6,775,633 | B2 | 8/2004 | Edge |
| 6,819,458 | B1 | 11/2004 | Tanaka et al. |
| 6,833,937 | B1 | 12/2004 | Cholewo |
| 6,836,345 | B1 | 12/2004 | Setchell |
| 6,859,551 | B2 | 2/2005 | Ohga |
| 6,888,553 | B2 | 5/2005 | Kim et al. |
| 6,934,053 | B1 | 8/2005 | Mestha et al. |
| 6,947,589 | B2 | 9/2005 | Newman et al. |
| 6,954,287 | B1 | 10/2005 | Balasubramanian et al. |
| 6,992,683 | B2 | 1/2006 | Shin et al. |
| 7,126,686 | B2 | 10/2006 | Tsujita |
| 7,134,737 | B2 | 11/2006 | Vilanova et al. |
| 7,158,146 | B2 | 1/2007 | Ohga |
| 7,265,830 | B2 | 9/2007 | Wang |
| 7,391,475 | B2 | 6/2008 | Pate et al. |
| 7,457,003 | B1 | 11/2008 | Marcu et al. |
| 7,463,386 | B2 | 12/2008 | Misumi |
| 2001/0015806 | A1 | 8/2001 | Baker |
| 2001/0038468 | A1 | 11/2001 | Hiramatsu |
| 2001/0045980 | A1 | 11/2001 | Leonard |
| 2002/0018121 | A1 | 2/2002 | Fasciano |
| 2002/0054384 | A1 | 5/2002 | Motamed |
| 2002/0105725 | A1 | 8/2002 | Sweatt et al. |
| 2002/0159065 | A1 | 10/2002 | Berstis |
| 2002/0169513 | A1 | 11/2002 | Sherrill et al. |
| 2003/0001860 | A1 | 1/2003 | Yamazaki et al. |
| 2003/0016289 | A1 | 1/2003 | Motomura |
| 2003/0053134 | A1 | 3/2003 | Haro |
| 2003/0156283 | A1 | 8/2003 | Jung et al. |
| 2003/0202183 | A1 | 10/2003 | Beimers et al. |
| 2003/0234943 | A1 | 12/2003 | Van Bael |
| 2004/0061912 | A1 | 4/2004 | Ohga |
| 2004/0190022 | A1 | 9/2004 | Kiyohara |
| 2004/0207862 | A1 | 10/2004 | Such et al. |
| 2004/0218072 | A1 | 11/2004 | Zhang |
| 2004/0245350 | A1 | 12/2004 | Zeng |
| 2005/0024379 | A1 | 2/2005 | Marks |
| 2005/0065440 | A1 | 3/2005 | Levenson |
| 2005/0073545 | A1 | 4/2005 | Vilanova et al. |
| 2005/0073685 | A1 | 4/2005 | Arai |
| 2005/0078122 | A1 | 4/2005 | Ohga |
| 2005/0078326 | A1 | 4/2005 | Stokes et al. |
| 2005/0094871 | A1 | 5/2005 | Berns et al. |
| 2005/0146735 | A1 | 7/2005 | Ternasky et al. |
| 2005/0281459 | A1 | 12/2005 | Bala et al. |
| 2006/0197966 | A1 | 9/2006 | Viturro et al. |
| 2007/0002344 | A1 | 1/2007 | Klassen |
| 2007/0177141 | A1 | 8/2007 | Ohishi et al. |

FOREIGN PATENT DOCUMENTS

| | | |
|---|---|---|
| EP | 1489831 | 12/2004 |
| EP | 1492330 (A1) | 12/2004 |
| GB | 2381983 | 5/2003 |
| KR | 20000019374 (A) | 4/2000 |
| KR | 20040036116 (A) | 4/2004 |
| KR | 20040036790 (A) | 5/2004 |
| WO | WO 9531794 | 5/1995 |
| WO | WO0042595 | 7/2000 |
| WO | WO 0117233 | 3/2001 |
| WO | WO2004012442 | 2/2004 |
| WO | WO2004012461 | 2/2004 |
| WO | WO2007027745 | 3/2007 |

OTHER PUBLICATIONS

Lou, et al., "Two Unsolved Issues in Colour Management—Colour Appearance and Gamut Mapping", 5th International Conference on High Technology, World Techno Fair in Chiba, Preceedings of Imaging Science and Technology: Evolution and Promise, Sep. 11, 1996, XP00106252, 136-147.

Wei-Ling, et al., "ColorSync: Synchronizing the Color Behavior of Your Devices", Digest of Papers of COMPCON (Computer Society Conference) 1996 Technologies for the Information Superhighway, Santa Clara, IEEE Comp. Soc. Press, vol. Conf 41, Feb. 25, 1996, pp. 440-444.

Hardeberg, "Color Management: Principles and solutions", 2001.

King, Why Color Management? Adobe Systems Incorporated, 2002.

Knight, "Decreasing Download Time through Effective Color Management", Microsoft Interactive Developer (1996).

"Windows Color Management: Background and Resources." (2001).

Yokoyama et al.. "A New Color Management System Based on Human Perception and its Application to Recording and Reproduction of Art Paintings", IS&T/SID Fifth Color Imaging Conference: Color Science, Systems and Applications. (1997); p. 169-172.

Corrigan, et al., "Silicon Light Machines—Grating Light Valve Technology Brief"; Jun. 2001 ver. C; 8 pages.

Daniels, "Eye-One Photo GretagMacbeth's Color Management For Professional Photographers," retrieved from the Internet on Nov. 22, 2005, http://www.shutterbug.com/test_reports/0304sb_eye/, Shutterbug, Mar. 2004, 5 pages.

Diffractive MEMS; 4 pages, 2002.

EETimes.com—Diffractive optical MEMs using grating light valve techinque; http://www.eetimes.com printed Jul. 18, 2005; 5 pages.

Drupa Product Review PT.1, Jun. 1, 2004; retrieved from the Internet Nov. 22, 2005; http://americanprinter.com/mag/printing_drupa_product_review/pp. 1-8.

Godil, "Diffractive MEMS technology offers a new platform for optical networks"; Laser Focus World May 2002. 3 pages.

Starkweather; "Increasing Screen Size Valuing Productivity" Jun. 18, 2002; 31 pages.

Lieberman, "Microsoft sets sights on future displays"; www.eet.com; printed Jul. 18, 2005; 5 pages.

Media For; Laser Focus World; http://laserfocusworld.printthis.clickability.com; printed Jul. 18, 2005.

Ostromoukhov, et al., "Two Approaches In Scanner-Printer Calibration: Colorimetric Space-Based vs. "Closed-Loop"," IS&T/SPIE 1994 Int'l Symposium on Electronic Imaging: Science & Technology, Feb. 6-Feb. 10, 1994, 10 pages.

Printing system offers multiple formats, Apr. 8, 2003; retrieved from the Internet Nov. 22, 2005, http://news.thomasnet.com/fullstory/21137/447, pp. 1-6.

Riesenberg, et al., "Optical MEMS for High-End Micro-Spectrometers"; SPIE vol. 4928; 9 pages, 2002.

Rosen, et al., "Color Management within a Spectral Image Visualization Tool," retrieved from the Internet Nov. 22, 2005, http://www.cis.rit.edu/people/faculty/fairchild/PDFs/PRO10.pdf, 7 pages. www.xrite.com/documents/literature/en/L11-044_DTP41_en.pdf; Unsurpassed Accuracy; DTP41 SeriesII AutoScan Spectrophotometer, 2006.

XYZ Observer Model 5B, retrieved from the Internet Nov. 22, 2005, http://www.spectralmasters.com/XYZ%20OBSERVER.html, 2 pages.

* cited by examiner

MULTIMEDIA COLOR MANAGEMENT SYSTEM

BACKGROUND

Color management refers to the process of attempting to display or render the same or similar colors on devices so that these colors appear consistently on these devices. For example, different monitors attached to different computer systems, or different monitors attached to the same computer system, may render the same color inconsistently. This inconsistent display may result from a number of factors, such as the technology employed in the different monitors, the design of the monitors, the age of the monitors, or the like.

Additionally, a given color within a piece of media may be rendered differently as it is transformed across different types of presentations. For example, a photographer may capture an image of a yellow flower using a digital camera. To the eye of the photographer, the yellow flower may appear to have a certain shade or hue of yellow. When the resulting photograph of the yellow flower is rendered in the camera's display, for example, an LCD display, the shade of the yellow flower may appear differently in the LCD than it did "live", due to the design of the camera's LCD display, for example. The photographer may download the photograph to a personal computer, display the photograph on the screen of the computer, and edit the photograph using a picture editor. Finally, the photographer may print the photograph on suitable paper using a color printer.

In each of the operations in the foregoing workflow, the yellow shade of the flower may change as the photograph is transferred from one type of presentation to another. These inconsistent displays of the given color, in this example, the yellow of the flower, may frustrate users and cause them to expend time and effort adjusting the various components of the workflow in an effort to achieve consistent renditions of color across the different devices. Other less committed users may simply quit using digital color systems, or accept the inconsistent color results.

Another factor complicating the consistent display of color across a variety of different devices and media is that fact that colors may be perceived differently depending on the ambient lighting conditions under which the colors are perceived. For example, a given object of a given color may appear quite differently when viewed indoors under artificial light, as compared to viewing the same object outdoors under natural sunlight. Even in the context of artificial light, the same object can appear to have different colors in tungsten lighting, as compared to fluorescent lighting, mercury-vapor lighting, sodium-based lighting, or the like.

SUMMARY

A multimedia color management system is described herein. Various embodiments of a method described herein can include receiving source color content that is associated with a source device, and transforming the source color content into destination color content for rendering on one or more destination devices. Various embodiments of an apparatus described herein can include a color infrastructure transformation engine that further includes a sequential transform component, which is adapted to receive source color content and to create a transform to facilitate mapping the source color content to destination color content. The color infrastructure transformation engine can also include a transform optimization component that is adapted to receive the transform and to create an optimized transform table based on the transform, and a transform execution component that is adapted to receive the optimized transform table and to generate the destination color content based thereon.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The teachings herein are described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
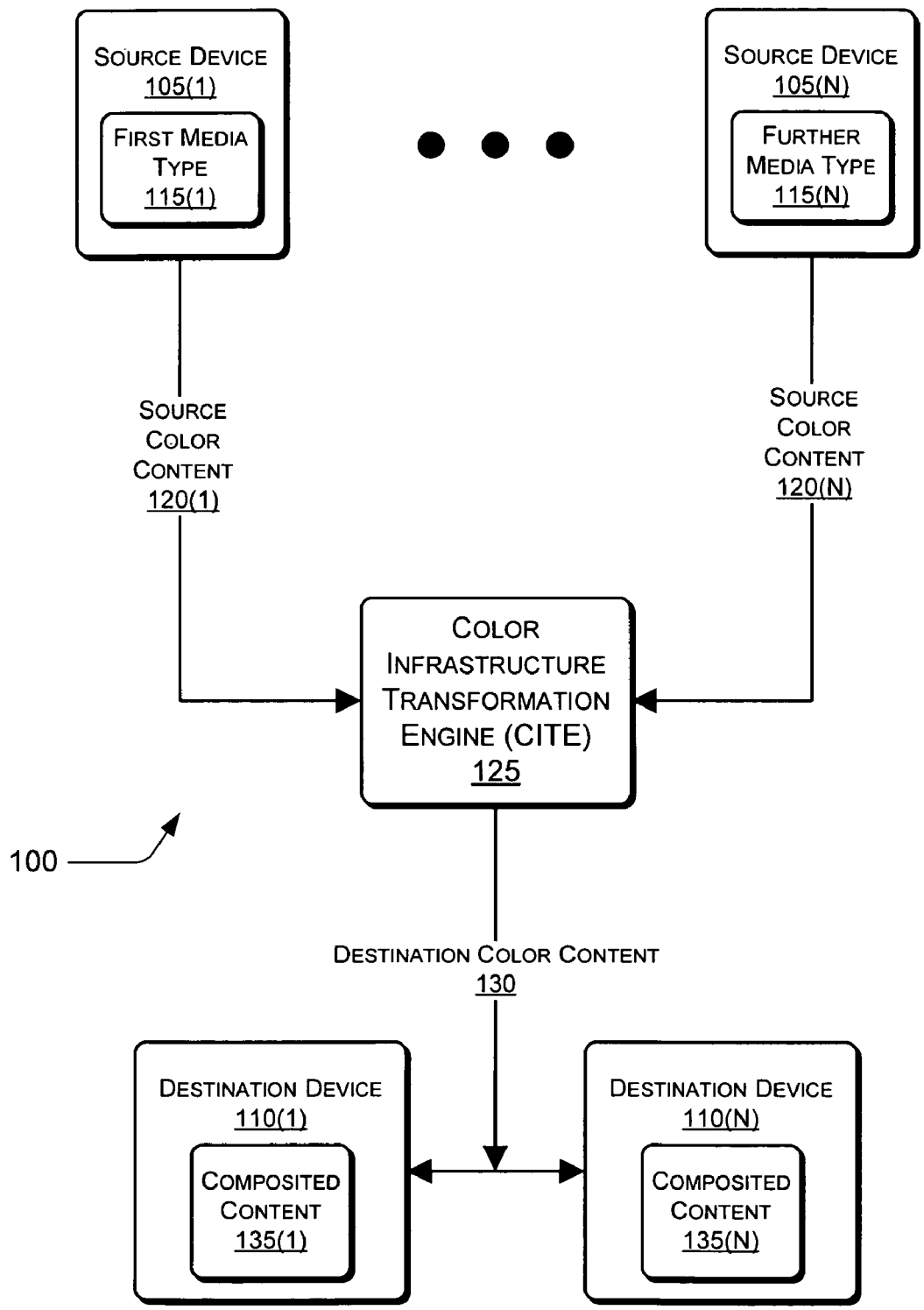
FIG. 1 is a block diagram illustrating components and data flows associated with an architecture for performing color management between one or more source devices and one or more destination devices.

FIG. 1 illustrates an architecture 100 for performing color management between one or more source devices 105(1) and 105(N) (collectively, source devices 105) and one or more destination devices 110(1) and 110(N) (collectively, destination devices 110). For convenience but not limitation, FIG. 1 shows two illustrative source devices 105 and two destination devices 110. However, the configuration shown in FIG. 1 is understood to be presented for convenience of illustration and discussion. Thus, FIG. 1 is illustrative and non-limiting, and the architecture 100 can include any number of source devices 105 and destination devices 110.

In the context of this description, the integer N as shown associated with some entity, or quantity of such entity, is understood to represent any integer value greater than one (1).

In FIG. 1, for example, N would take the value of two (2) when describing the number of source devices 105 included in the illustrative implementation shown therein.

Color management refers to the process of ensuring that given colors appear the same across a variety of different hardware and software environments. For example, the source devices 105(1) and 105(N) may be different devices altogether, such as scanners, cameras, video recorders, mobile telephones, personal digital assistants (PDAs), handheld or tablet computers, or the like. Alternatively, the source devices 105 shown in FIG. 1 may be computer systems that include displays or monitors from different manufacturers. As such, these different displays may process given colors differently and may exhibit different color display characteristics or capabilities. Also, the source devices 105 may be considered to be the displays or monitors themselves.

Different media types 115(1) and 115(N) are shown in FIG. 1 as being associated with the source devices 105(1) and 105(N), respectively. The media types 115(1) and 115(N) are referred to collectively as media types 115 for convenience. For example, media type 115(1) may be still color photography, with the source device 105(1) being a camera (digital or possibly non-digital) that is configured to capture still images. Media type 115(N) may be motion picture color content, with the source device 105(N) being a camera (digital or possibly non-digital) that configured to capture video or motion pictures. It is understood and emphasized that the media types 115 can take any number of forms, including, but not limited to, the various forms illustrated in FIG. 2 and discussed below.

Associated with the source devices 105 is respective source color content 120. In FIG. 1, source color content 120(1) is shown associated with the source device 105(1), and source color content 120(N) is shown associated with the source device 105(N).

The source color content 120 is provided to a Color Infrastructure Transformation Engine (CITE) 125. The CITE 125 is operative to map the source color content 120 into destination color content 130 as appropriate to render the source color content 120 consistently onto the destination device 110 as composited content 135. Respective instances of the composited content 135(1) and 135(N) are shown in FIG. 1 as associated with destination devices 110(1) and 110(N), respectively.

As part of its processing, the CITE 125 can map the source color content 120 into an intermediate color space. Illustrative embodiments of the CITE 125 can utilize, for example, an intermediate color space referred to herein as the "SCRGB Color Space", which is defined in IEC 61966-2-2 and was established in October 2001. Certain features make the SCRGB Color Space suitable for use by the CITE 125 as an intermediate color space. First, the SCRGB Color Space allocates thirty-two (32) bits per color channel to represent color. Second, the SCRGB Color Space provides a wider dynamic range than other intermediate color spaces. The "dynamic range" of a device or color space refers to the range or distance between the brightest and darkest extremes supported by the device or color space. Third, the SCRGB Color Space supports a color gamut that is sufficiently wide to support any color that is perceivable by the human visual system. Fourth, the "gamma" parameter associated with the SCRGB Color Space is 1.0. This value of the gamma parameter indicates that colors mix in the SCRGB Color Space the same as photons. This mixing characteristic can be helpful when rendering colors on the destination device 110. Also, because the "gamma" parameter is 1.0, linear mathematical operations apply to the SCRGB Color Space. Linear mathematical operations provide optimum fidelity for graphic effects such as scaling, rotation, blending, 3D warping, anti-aliasing lines/text, and alpha support, among others.

In providing the foregoing description of the features of the SCRGB Color Space, it is understood that the subject matter described herein may be implemented using intermediate color spaces other than the SCRGB Color Space. Instead, the subject matter described herein may be practiced with other intermediate color spaces that may exhibit one or more of the above characteristics, or may otherwise be suitable for practicing the teachings herein.

Figure 2:
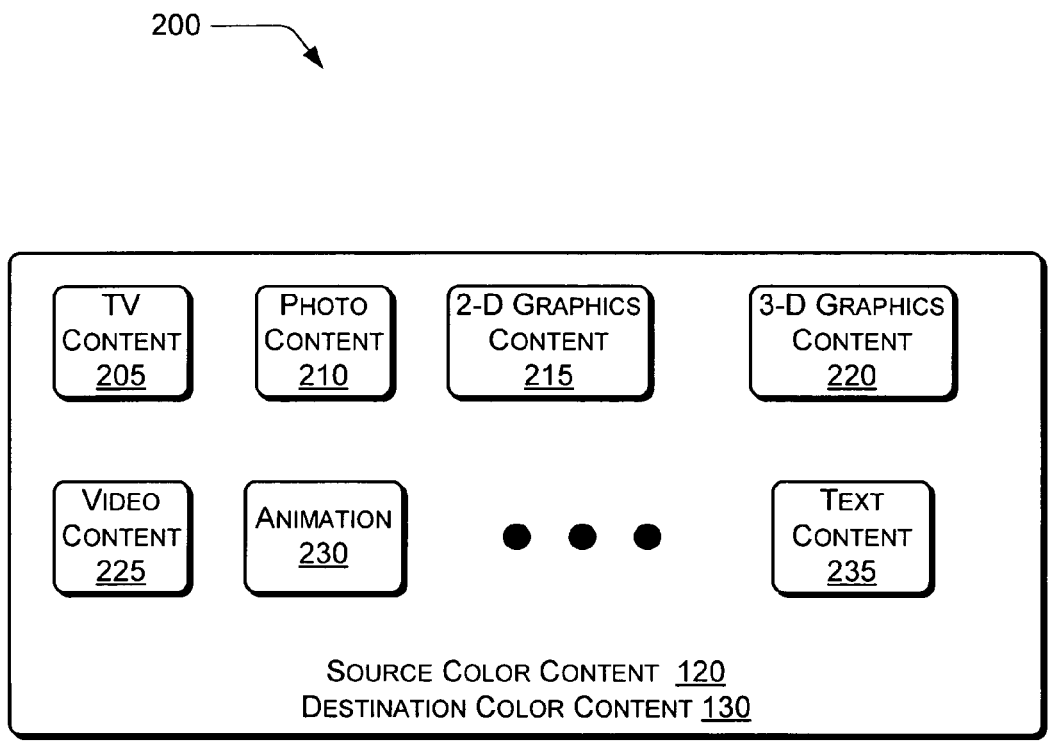
FIG. 2 is a block diagram illustrating several examples of source and destination color content as shown in FIG. 1.

FIG. 2 illustrates several examples of various forms of different media types 115 that the source color content 120 and the destination color content 130, as shown in FIG. 1, may take. Different instances of the source color content 120 and/or the destination color content 130 may take the form of television content 205, photographic content 210, two-dimensional graphics content 215, three-dimensional graphics content 225, 220, video content 225, animation content 230, and text content 235. The ellipses appearing in FIG. 2 further indicate the illustrative nature of the example source color content 120 and destination color content 130 shown in FIG. 2. It is also noted that the source devices 105 shown in FIG. 1 can include any device appropriate for capturing, displaying, or printing any of the illustrative source color content 120 or destination color content 130 shown in FIG. 2.

Table 1 shown below illustrates various combinations of media types, market types, and sample operations that may involve each media type within each market type. The media types shown in FIG. 2 are listed along the leftmost column of Table 1. The top row of Table 1 is divided into three different illustrative markets: the consumer market, the enterprise market, and the professional market. It is understood that Table 1 represents only one illustrative way to divide the markets, and is provided as shown for convenience of discussion only. It is noted that markets may be divided in other ways without departing from the spirit and scope of the subject matter described and claimed herein.

For convenience of discussion herein, but not limitation, the "consumer market" is understood to refer to users who may be performing color management tasks for their own casual or personal use, rather than for business purposes. The term "enterprise market" is understood to refer collectively to users performing color management tasks in a business environment, rather than a personal use environment. However, this business environment need not be a business whose main focus is printing or publishing. Instead, this business environment can be, for example, any corporate setting where capturing, displaying, and printing colored content is helpful to the business, but is not the core function of the business. The term "professional", on the other hand, is understood to refer collectively to users performing color management tasks in a business environment where the core function or focus of the business is, for example, processing colored content. Examples might include printing or publishing houses, motion picture or photography studios, or the like.

Within each of the three illustrative markets, Table 1 presents three illustrative functions, capture, display, and print. Therefore, for each media type, Table 1 presents workflow components relevant to capturing, displaying, and printing that media type within each of the three illustrative markets.

TABLE 1

|  | Consumer | | | Enterprise | | | Professional | | |
| --- | --- | --- | --- | --- | --- | --- | --- | --- | --- |
|  | Capture | Display | Print | Capture | Display | Print | Capture | Display | Print |
| Still Imaging | DSC | Windows Photo Viewer | Photo Printers | DSC | Office and Share Point | Photo quality printers | DSC/Raw | Adobe Creative Suite | large format inkjet printers and proofing printers |
| 2D Graphics | scanner using OCR | email and web pages | MFPs | Scanner/ Copiers using OCR | Publisher (Marketing Materials, Advertising) | Work-group Printers | Scanners/ copiers using OCR | Adobe Creative Suite | Adobe Postscript printers |
| 3D Graphics | N/A | Web Pages (with Product Ads content) | Rendered to Photo Printers or MFPs | N/A | Visio | High Quality Rendering to 2D into work group printers | Modeling devices and software | AutoDesk suite (3dMax) | High Quality Rendering to 2D into Adobe Postscript printers |
| Video | Camcorder, Mobile Phone, Digital Camera, etc. | Windows Media Player | N/A | Video Conferening systems | Video Conferencing applications and Windows Media Player | N/A | Video and Digital Camera | Adobe Premiere | N/A |
| Animation | N/A | Browser plugins (i.e. Adobe Flash) | N/A | N/A | Adobe Flash (Training, Advertising) | N/A | N/A | Adobe Flash | Storyboard output to Adobe Postscript printers |
| Text | scanner | Platform effects (Clear type) | Printers (with text optimizations in drivers) | Character and Handwriting Recognition | Microsoft Word (Readability, Clear type) | Work group printers (Word Processors, etc). | Scanners/ copiers using OCR | Microsoft Word | laser printers |

Figure 3:
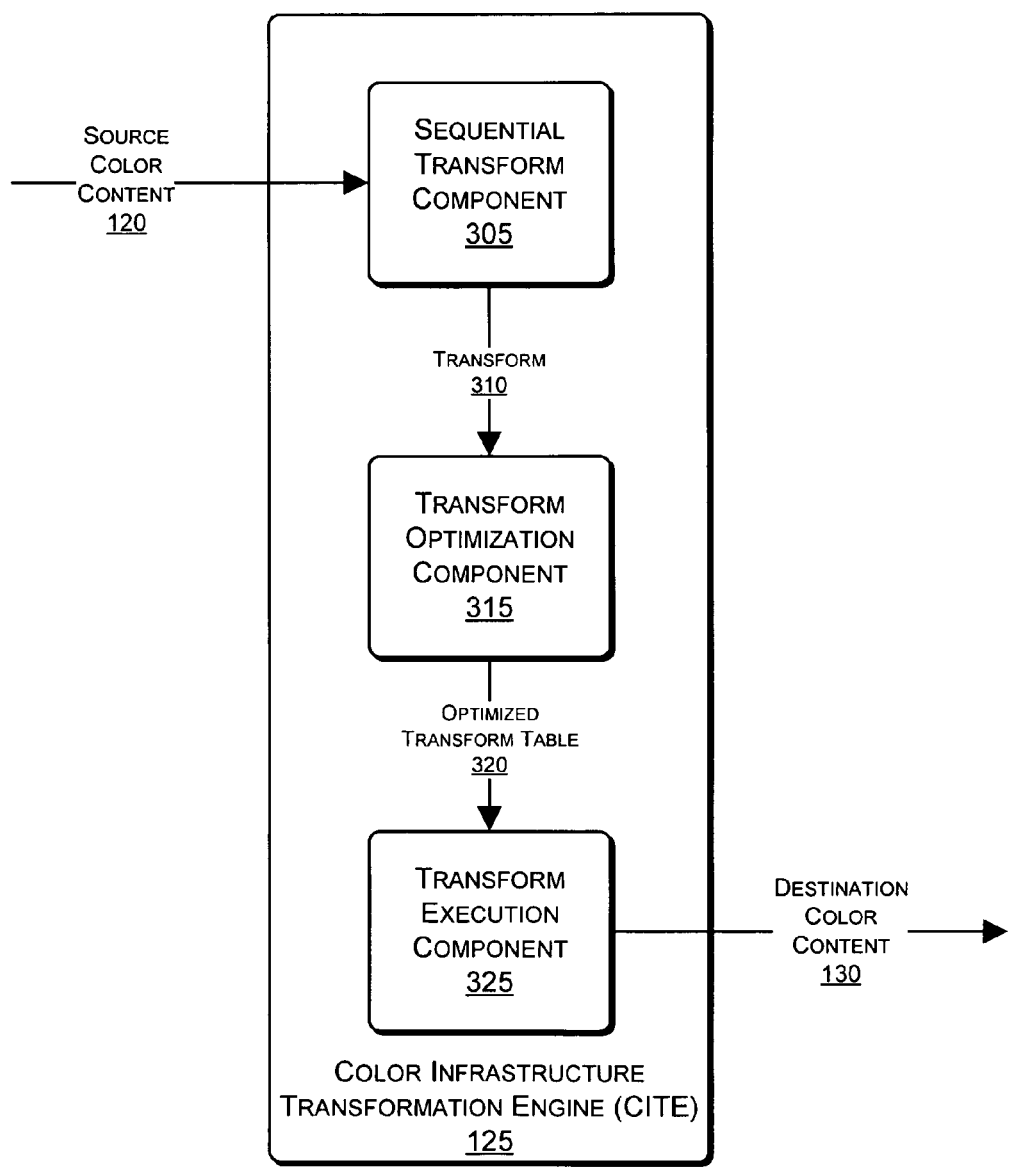
FIG. 3 is a block diagram illustrating illustrative components and data flows associated with a color infrastructure transformation engine (CITE), which is shown in FIG. 1.

FIG. 3 depicts illustrative components of the CITE 125. As shown in FIG. 3, the CITE 125 can include a sequential transform component 305, a transform optimization component 310, and a transform execution component 325. The sequential transform component 305 is operative to create one or more transforms 310 that mapping or translating the source color content 120 to the destination color content 130.

The transform optimization component 310 is operative to pass a buffer of color samples from the source color content 120 through the sequential transform component 305 to create an optimized transform table 320. The optimized transform table 320 maps the color samples from the source color content 120 into the color samples in the destination color content 130.

The transform execution component 325 executes the optimized transforms 315 to produce the destination color content 130. More particularly, respective colors within the source color content 120 are indexed into the optimized transform table 320, and are interpolated to determine resulting destination colors for rendering the destination color content 130. The transform execution component 325 is supported by pixel formatting and caching methods, as described further below.

Figure 4:
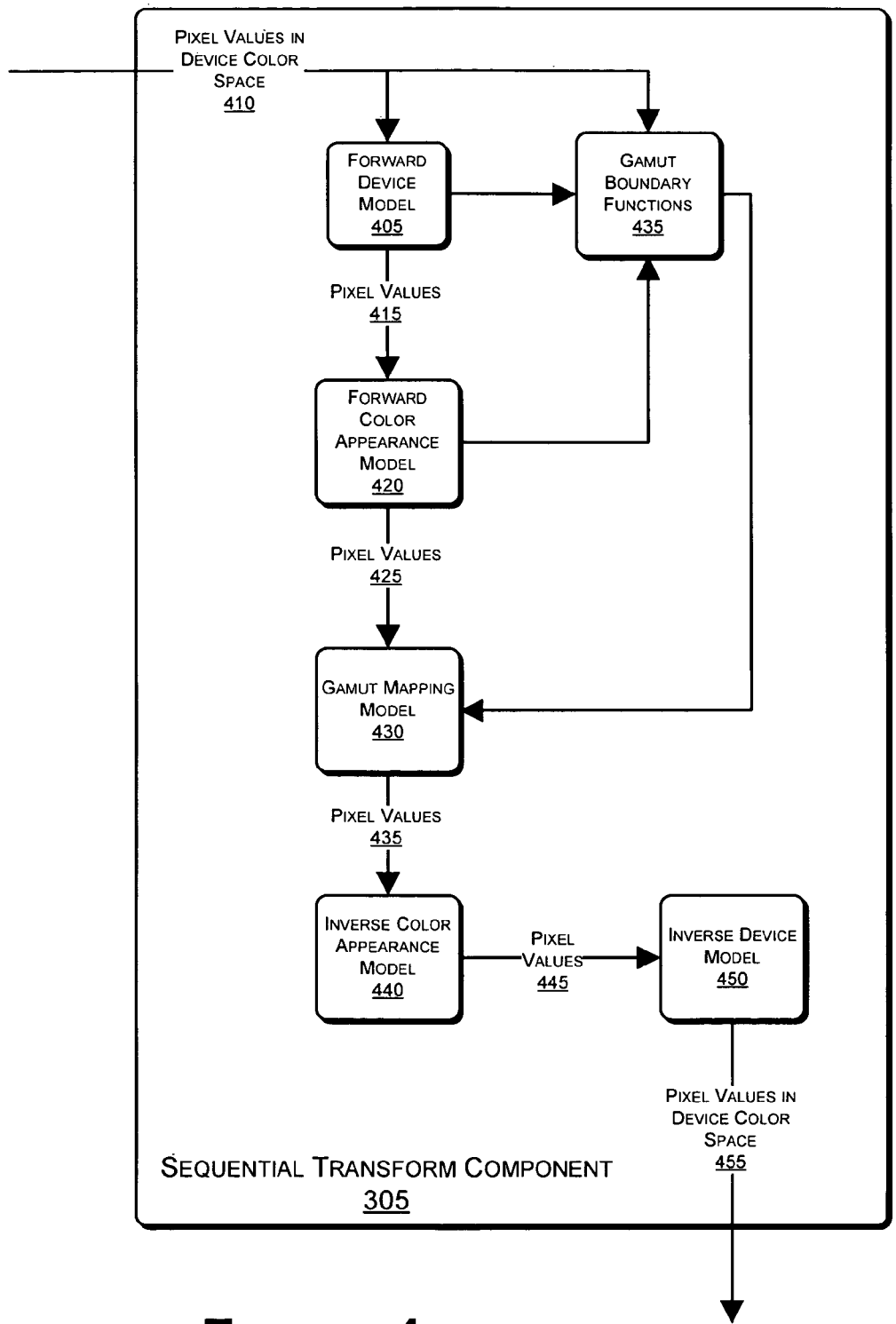
FIG. 4 is a block diagram illustrating components and data flows associated with a sequential transform component shown in FIG. 3 as part of the CITE.

FIG. 4 depicts details regarding the sequential transform component 305 shown in FIG. 3. The sequential transform component 305 may be viewed as defining at least part of a transformation pipeline that functions to receive color pixel values 410 defined within the color space of one or more source devices 105, convert these color pixel values 410 into "intermediate" pixel values defined within a device-independent color space, and then inverse the "intermediate" pixel values into color pixel values defined within the color space of one or more destination devices 110. The sequential transform component 305 is part of a modular architecture or system 100 that can operate with a variety of different source devices 105 and destination devices 110 and viewing conditions. The architecture 100 can also use color contexts that contain boundary information (described in connection with FIG. 5 below) that enable the architecture 100 to process across different media. Illustrative components comprising the transformation pipeline implemented by the sequential transform component are now described.

A forward device model 405 receives pixel values 410 in the color space of the source device 105, and drives the translation of these pixel values 410 from a source color space into corresponding pixel values 415 in a device-independent color space.

A forward color appearance model 420 receives the pixels 415 in the device-independent color space, and drives the translation of these pixels from the device-independent color space into corresponding pixel values in a device- and viewing-condition-independent intermediate space.

One or more gamut mapping models 430 receive the pixel values 425, and drive the mapping between color spaces circumscribed by different gamuts. An illustrative definition for the term "gamut mapping models" appears at the end of this description. The device gamuts themselves are derived from a device model profile and a color appearance model profile by gamut boundary functions. The gamut mapping models 430 produce pixel values 435 that are mapped to the device gamuts.

An inverse color appearance model 440 drives the translation of the pixels 435 from the intermediate device- and viewing-condition-independent space back into a device-independent color space. The output of the inverse color appearance model 440 is represented in FIG. 4 by the pixel values 445.

An inverse device model 450 drives the translation of the pixel values 445 from the device-independent color space into pixel values 455 in the color space of the destination device 110. Each of these sequential transform models is supported by the corresponding model profile.

Figure 5:
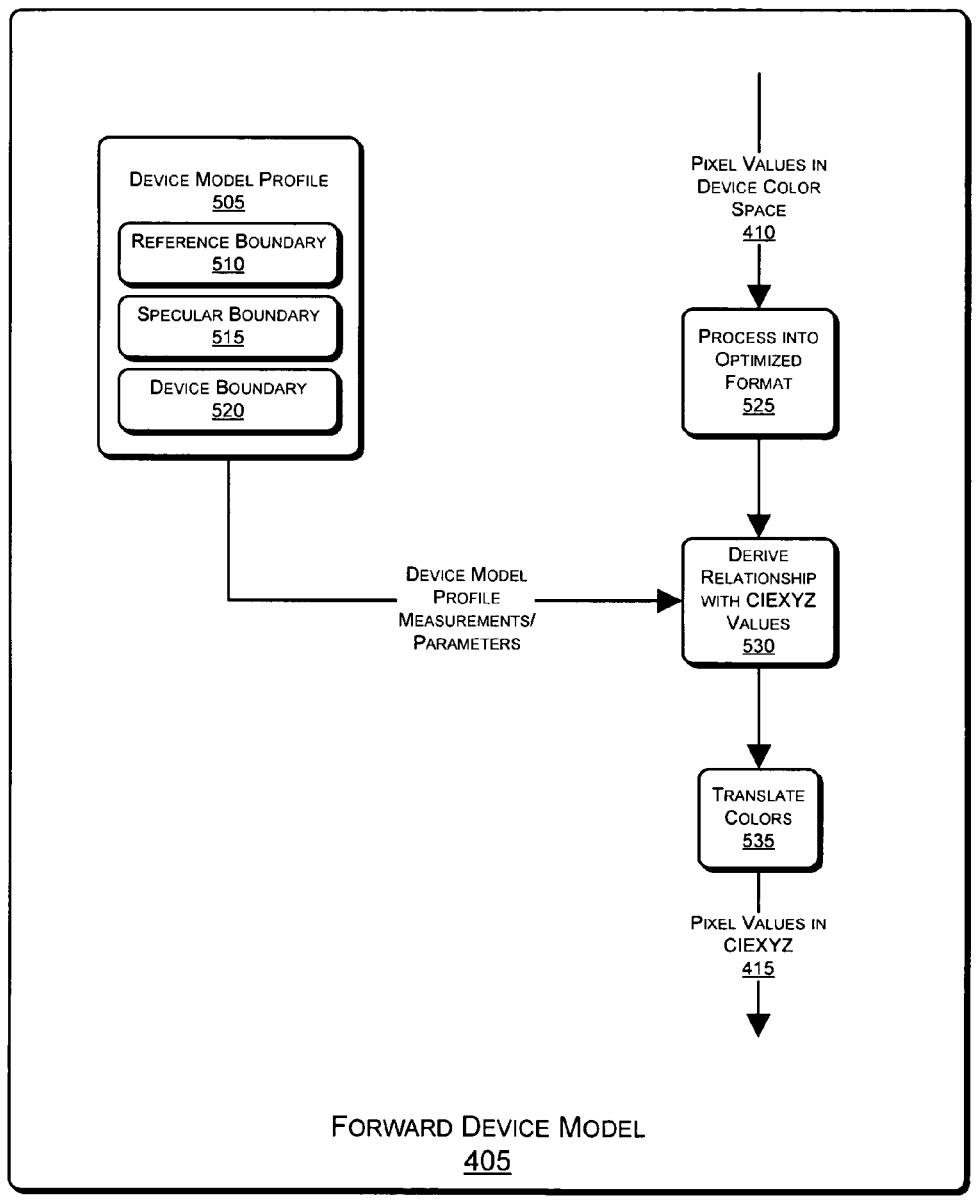
FIG. 5 is a block diagram illustrating components and data/process flow relating to a forward device model shown in FIG. 4.

FIG. 5 depicts further processing details relating to the forward device model 405 shown in FIG. 4. The device models (DMs) 405 may be viewed as algorithms that convert pixel colors between values 410 defined within the color space of the source device 105 device and values 415 defined within a device-independent color space. An example of a device-independent color space is CIEXYZ, which is a mathematical color space produced by the CIE (Commission Internationale de l'Eclairage) that describes color in terms of synthetic primaries X, Y and Z. The primaries are imaginary mathematical constructs that model the human eye's response to different wavelengths of light. CIEXYZ values, sometimes referred to as tristimulus values, are device-independent, but are viewing-condition-dependent. Illustrative embodiments of the architecture 100 can use the color space based on XYZ determined for the CIE Standard 1931 Colorimetric Observer (the 2 degree observer), relative to D50 illuminant, and measured with 0/45 or 45/0 geometry, for reflecting media. The CIEXYZ values 415 are then consumed by the forward color appearance model 420, shown in FIG. 4.

The source device model 405 serves as the initial input stage of the transformation pipeline implemented by the sequential transform component 305, and converts color values 410 defined within the color space of the source device(s) 105 into, for example, CIEXYZ values. Recall that, as shown in FIG. 4, the destination device model is inverted for the final output stage, when CIEXYZ values 415 are converted out to color values 455 defined within the color space of the destination device 110. These conversions are based on the data contained in the corresponding Device Model Profile (DMP) 505. The DMP 505 contains physical measurement data derived by sampling a color measurement target, and relates colors supported by a given device to colors as perceived by the human visual system. The DMP 505 may optionally contain parameters related to mathematical models. It can also contain a reference to the targeted device model.

A DMP 505 can specify several parameters for a given device, illustrative but non-limiting examples of which are recited in Table 2 below. Also, respective illustrative values for each parameter are provided for television color spaces and photographic color spaces. These illustrative values for each parameter are provided assuming eight (8) bits are allocated per channel of color.

TABLE 2

| Parameter | Television Color Space | Photographic Color Space |
| --- | --- | --- |
| Minimum Colorant Value (i.e., representation of black) | 16 | 0 |
| Maximum Colorant Value (i.e., representation of white) | 235 | 255 |
| Maximum Range Limit (i.e., highest value attainable in color space) | 255 | 255 |
| Minimum Range Limit (i.e., lowest value attainable in color space) | 0 | 0 |

The DMP 505 provides a consistent set of definitions to help map between the media types. A Reference Boundary 510 is defined as the limits for which no additional values beyond that are commonly discernable for that device in that viewing condition. This Reference Boundary 510 may correspond to reference black for television or diffuse white for motion pictures. A Specular Boundary 515 is defined as the limits for which color values beyond it are considered impractical, implausible, unreal, or irrelevant. A Device Boundary 520 is defined as the limits producible by that device. The Reference Boundary 510, the Specular Boundary 515, and the Device Boundary 520 parameters are referred to herein, separately or collectively, as media boundary information.

This consistent set of definitions 510, 515, and 520 enables the device model profiles 505 to define specific boundary values, and for these boundary values to be properly processed by the CITE 125. For example, when source color or media content 120 is processed through the optimized transform referenced to these values from the DMP 505, the color or media content 120 could be clipped to the device boundary 520 and nonlinearly scaled to the specular boundary 515 and to the reference boundary 510, with the assurance that similar operations will occur in the destination processing to maintain consistent meaning for the media content across media types.

The device model 405 can perform at least the following illustrative functions, represented by respective blocks shown in FIG. 5. In block 525, the device model 405 processes the measurement values into a form optimized for the device models 405. In block 530, the device model 405 statistically derives either mathematical equations or multi-dimensional look-up tables from the measurement data. These functions can directly use the analytical parameters supplied by the DMP, if they are up-to-date. In block 535, the device model 405 uses these derived relationships to translate between pixel color values 410 in a native device color space and corresponding pixel values 415 in the CIEXYZ color space.

The architecture 100 can provide one or more built-in "baseline" device models for common device classes, including but not limited to monitors (CRT and LCD), printers (RGB and CMYK), RGB capture devices (scanners and digital cameras), and video projectors. Also, support for interoperability with International Color Consortium (ICC) color profiles can be achieved via a special "ICC Virtual Device Model". Additionally, third parties may provide their own device models through a plug-in infrastructure, and target them by vendor-specific plug-in nodes within the DMP.

Figure 6:
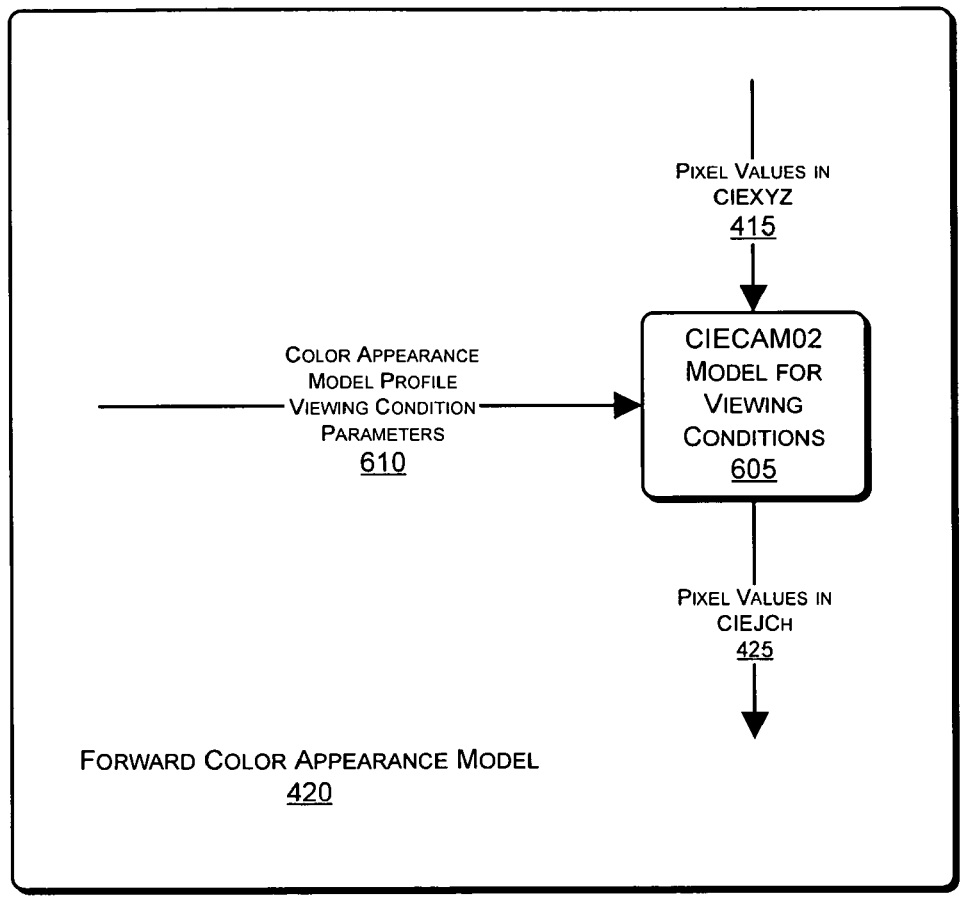
FIG. 6 is a block diagram illustrating components and data flows relating to a forward color appearance model as shown in FIG. 4.

FIG. 6 depicts further details relating to the forward color appearance model 420 as shown in FIG. 4. The color appearance model (CAM) 420 is an algorithm that extends CIEXYZ tristimulus values to describe the appearance of color stimuli under different lighting conditions and backgrounds. These extended values are represented in FIGS. 4 and 6 by the pixel values 425. The pixel values 425 can take the form of color appearance correlates that are consumed by the gamut mapping model 430.

Illustrative embodiments of the architecture 100 can use the CIECAM02 color appearance model 605, which is described in the publication "A Colour Appearance Model for Colour Management Systems: CIECAM02", Publication CIE 159:2004, ISBN 3901906290. The inputs to the color appearance model 605 in the forward direction can be CIEXYZ pixel values 415 for the color stimulus. The viewing conditions can be described by parameters 610 supplied by a Color Appearance Model Profile (CAMP).

The CIECAM02 model 605 can operate in two directions. In the colorimetric to appearance direction, it provides a mapping from CIE XYZ space to color appearance space. In the appearance to colorimetric direction, it maps from color appearance space back to XYZ space. The color appearance correlates of interest are lightness (J), chroma (C), and hue (h). These three values can be viewed as forming a cylindrical coordinate system. However, it may be more convenient to work in a rectangular coordinate system, so rectangular coordinate values a and be can be computed as a=C cos h and b=C sin h, giving CIECAM02 Jab.

For the purposes of the instant discussion, CAM lightness values greater than 100 can be used. The CIE committee that formulated CIECAM02 did not address the behavior of the lightness axis for input values with a luminance greater than the adopted white point as defined in the CIECAM02 reference (that is, for input Y values greater than the adopted white point's Y value). However, the luminance equations in CIECAM02 may behave reasonably for such values. That is, the lightness increases exponentially and follows the same exponent (roughly ⅓).

Table 2 below lists several illustrative functions related to the CAMP:

TABLE 3

| degreeOfAdaptation | Behavior |
| --- | --- |
| –1.0 | (This is the default CIECAM02 behavior) $D = F\left[1 \dfrac{1}{3.6}\right] e^{\left(\dfrac{-(L_A+42)}{92}\right)}$ |
| 0.0 <= degreeOfAdaption <= 1.0 | D = degreeOfAdaptation (That is, we use the value supplied by the user.) |

Error checking can be supported by various implementations of the teachings herein. The equation numbers below are those used in the CIE 159:2004 definition of CIECAM02.

In the ColorimetricToAppearanceColors function:

The input values are checked for reasonableness: If X or Z<0.0, or if Y<–1.0, then the HRESULT is E_INVALI-

TABLE 2

| Name | Arguments | Description | Results |
| --- | --- | --- | --- |
| ColorimetricToAppearanceColors | _in UINT cColors, _in_ecount(cColors) Const XYZColorF *pInputColors, _out_ecount(cColors) JChColorF *pOutputColors | Converts CIEXYZ colors into CIEJCh colors | HRESULT |
| AppearanceToColorimetricColors | _in UINT cColors, _in_ecount(cColors) const JChColorF *pInputColors, _out_ecount(cColors) XYZColorF *pOutputColors | Converts CIEJCh colors into CIEXYZ colors | HRESULT |
| ChromaticAdaptationTransform | _in XYZColorF *pSrcWhitePoint, _in XYZColorF *pDstWhitePoint, _in UINT cColors, _in_ecount(cColors) XYZColorF *pInputColors, _out_ecount(cColors) XYZColorF *pOutputColors | Given an array of measured colors in colorimetric space and translate them using chromatic adaptation transform with provided white points. | HRESULT |
| ColorimetricToAppearanceColors | _in UINT cColors, _in_ecount(cColors) const XYZColorF *pInputColors, _out_ecount(cColors) JChColorF *pOutputColors | Converts CIEXYZ colors into CIEJCh colors | HRESULT |

Users sometimes want to change the way that a degree of adaptation parameter (D) is calculated. The design described herein allows users to control this calculation by changing the degreeOfadaptation value in the viewing conditions parameters (shown in Table 3 below). Rather than a using a surround value that is one of AVERAGE, DIM, and DARK, the design described herein provides a continuous surround value, computed from a value c. The value of c is a float between 0.525 and 0.69. From c, Nc and F can be computed using piecewise linear interpolation between the values already provided for Dark, Dim, and Average. This computation models what is shown in FIG. 1 of CIE 159:2004, the CIECAM02 specification.

DARG. If –1.0<=Y<0.0, then J, C, and h are all set to 0.0. There are certain internal conditions that can produce error results. Rather than produce such results, the CITE 125 clips these internal results to produce in-range values as output. These happen for specifications of colors that would be dark and impossibly chromatic: In equation 7.23, if A<0, A=0. In equation 7.26, if t<0, t=0.

In the AppearanceToColorimetricColors function:

The input values are checked for reasonableness: If C<0, C>300, or J>500, then the HRESULT is E_INVALIDARG. There are certain internal conditions that can produce error results. In equation 8.21, we compute:

$$RGB'_a \text{MAX} = \frac{400.0 * 2F_L^{0.42}}{27.13 + 2F_L^{0.42}}$$

$R_a'$, $G_a'$, and $B_a'$ are clipped to the range$\pm RGB_a'$MAX.

For all Device Model Profiles (DMP), the CITE 125 examines the profile's medium white point, which can be identified either as the MediumWhitePoint or as the WhitePrimary. If the Y is not 100.0, then for all Color Appearance Model Profiles (CAMP), the CITE 125 will examine the adopted white point. If the Y is not 100.0, then the adopted white point can be scaled so that Y does equal 100.0. The same scaling can be applied to the background value. The scaling factor is 100.0/adoptedWhitePoint.Y. The same scaling factor is applied to each of X, Y, and Z.

The CITE 125 can then compare the light source white point used in the DMP to the adopted white point in the CAMP. If they do not agree to three significant figures, then the CITE 125 can modify the viewing conditions used to initialize the color appearance model by replacing the adapted white point in the viewing conditions with the light source white point from the DMP.

In some implementations, it may be advantageous to scale the colorimetric values coming from the DeviceToColorimetric function. First, the hyperbolic lightness equations in the CAM may be designed for a white point luminance of 100.0. The only place where differences in the absolute luminance (or illuminance) come into play is in the luminance of the adapting field. So the CAM must be initialized with a white point Y of 100.0. But if the device model's medium white point doesn't also have a Y value of 100.0, then it may appear too dim. To address this situation, the CITE 125 can scale the Y values in the measurements. Also, the CITE 125 could scale the measurement values before initializing the device model. Then, results would already be in the proper range. However, this approach could make testing the device model more difficult, because the values coming out may require scaling.

In some implementations, it may also be advantageous to modify the viewing conditions before initializing the color appearance model. For example, if the light source white point of the DMP does not match the adopted white point in the CAMP, then a capture of a perfectly reflecting diffuser may not come out with a perfectly white appearance. However, if the adopted white point of the CAMP is modified, then the perfect white appearance may be achieved. Because real media are almost never perfectly neutral, so it may advisable to differentiate between the light source white point, which may be measured from a perfectly reflecting diffuser, and the medium white point.

The outputs of the color appearance model 605 can be device- and viewing-condition-independent CIEJCh values 425, which are mathematical correlates for the perceptual attributes of color. In the reverse direction, given the appropriate viewing condition parameters 610, CIEJCh values 425 can be converted back into CIEXYZ values 415.

Figure 7:
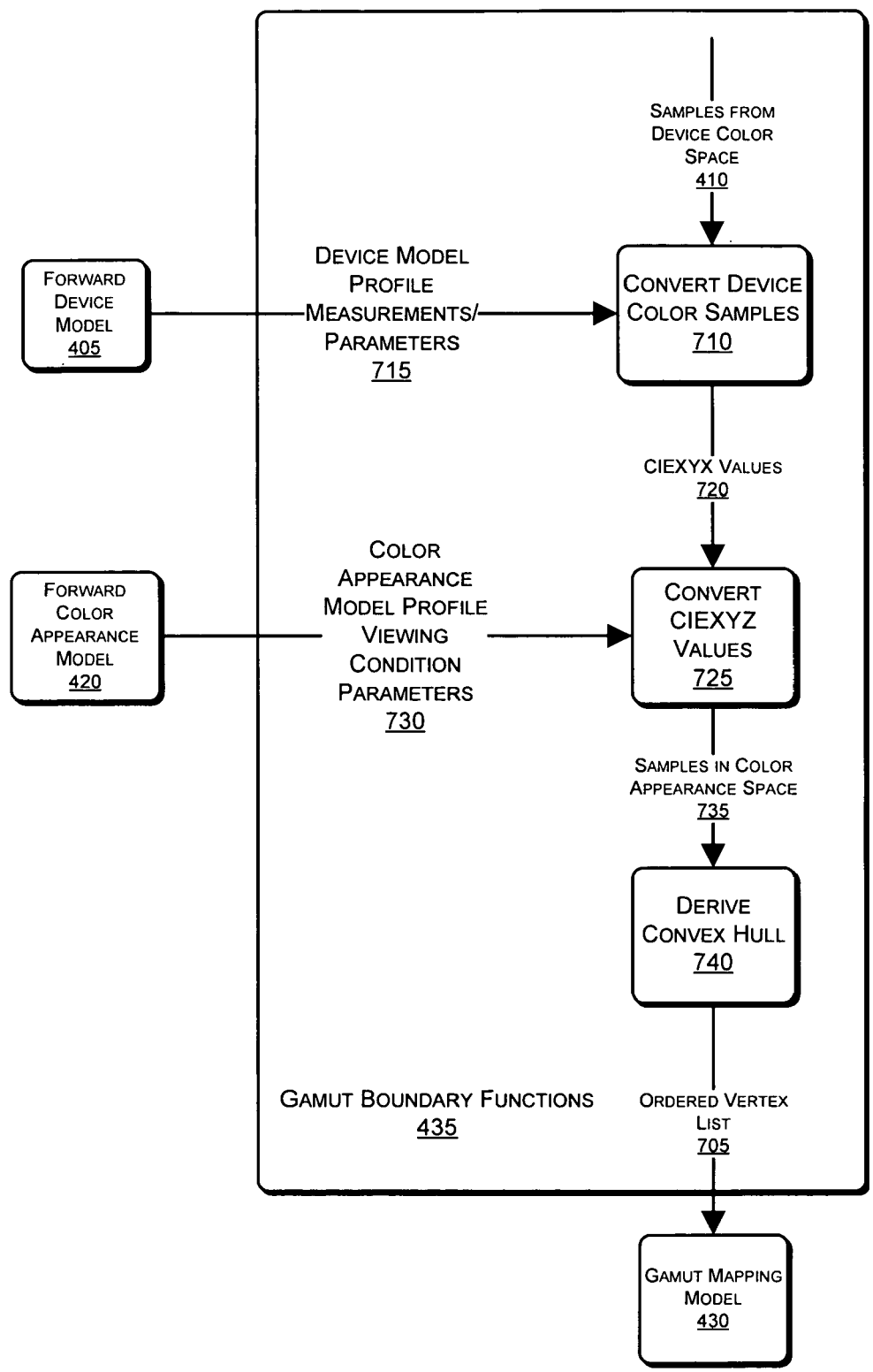
FIG. 7 is a block diagram illustrating components and data flows relating to gamut boundary functions that are shown in FIG. 4.

FIG. 7 depicts further aspects of the gamut boundary functions 435 shown in FIG. 4. The gamut boundary functions 435 are algorithms that compute the gamut boundary of a given color device, using the device model profile and other CITE translation components. The resulting gamut boundary descriptors (GBDs) are then consumed by the gamut mapping model 430.

Given a sampling of pixel values 410 in the device color space, the gamut boundary functions 435 derive a description of the device gamut as an ordered vertex list 705 of the gamut boundary. This can be accomplished by at least the following processing, represented in FIG. 7 by respective blocks. In block 710, the gamut boundary functions 435 convert the device color samples 410 to CIEXYZ values 720, using parameters 715 representing the DMP from the device model 405.

In block 725, the gamut boundary functions 435 convert the CIEXYZ values 720 to values 735 in a color appearance space, using the color appearance model 420 and parameters 730 representing the CAMP.

In block 740 the gamut boundary functions 435 derive or form a convex hull (the outer shell of the gamut) by surrounding the sample points 735 with a surface. The ordered list 705 of the vertices defining the convex hull is generated and output from block 740. This ordered list 705 is provided to the gamut mapping model 430.

Figure 8:
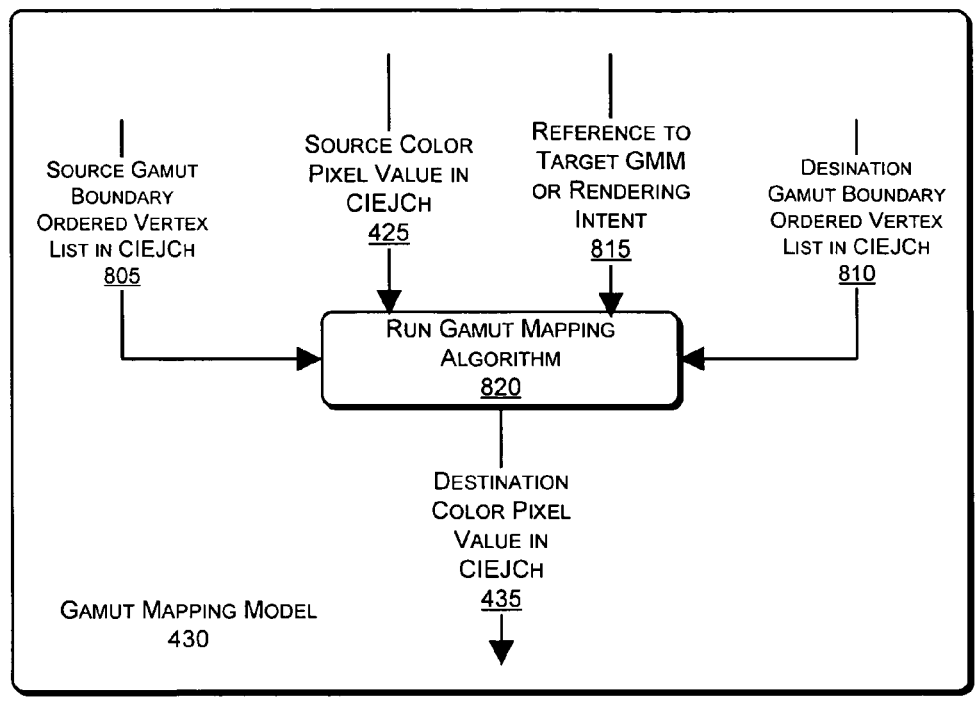
FIG. 8 is a block diagram illustrating components and data flows relating to a gamut mapping model shown in FIG. 4.

FIG. 8 depicts further aspects related to the gamut mapping model 430 shown in FIG. 4. The gamut mapping models 430 (GMMs) are algorithms that map color from one color space to a second color space, while satisfying some constraint on the output color. The nature of the constraint determines the choice of gamut mapping algorithm. Each GMM 430 embodies a certain gamut mapping style or preference, also called "rendering intent".

Illustrative embodiments of the GMM 430 can take as input one or more pixel values 425 of the source color that is to be gamut-mapped. The GMM 430 can also receive as input a parameter 805 that represents a gamut boundary circumscribing the source color space, and a parameter 810 that represents a gamut boundary circumscribing the destination color space. A parameter 815 indicates a choice of Gamut Mapping Algorithm (GMA), expressed as a reference to a target GMM or as a rendering intent. An algorithm 820 run by the GMM 430 produces as output one or more destination pixel values 435 in, for example, the CIEJCh color appearance space. The gamut mapping itself can take place in the color appearance (CIEJCh) space. Also, both input and output colors, as well as the gamut boundary vertex lists, can be expressed in the color appearance (CIEJCh) space.

The architecture 100 can provide, for example, the following different illustrative baseline GMMs 430 (one of which has 2 variations), whose effects correspond to that of the four ICC rendering intents. These GMMs 430 and their corresponding rendering intents are as follows:

| WCS GMM | Corresponding ICC Rendering Intent |
| --- | --- |
| Sigmoidal Gaussian Cusp Knee clipping (SGCK) | Perceptual |
| HueMapping | Saturation |
| Hue Preserving Minimum Color Difference (HPMinCD) with white point adaptation | Media-Relative Colorimetric |
| Hue Preserving Minimum Color Difference (HPMinCD) without white point adaptation | Absolute Colorimetric |

Third parties may provide their own plug-in gamut mapping models 430 through a plug-in infrastructure, and target them by vendor-specific plug-in nodes within the GMMP.

Figure 9:
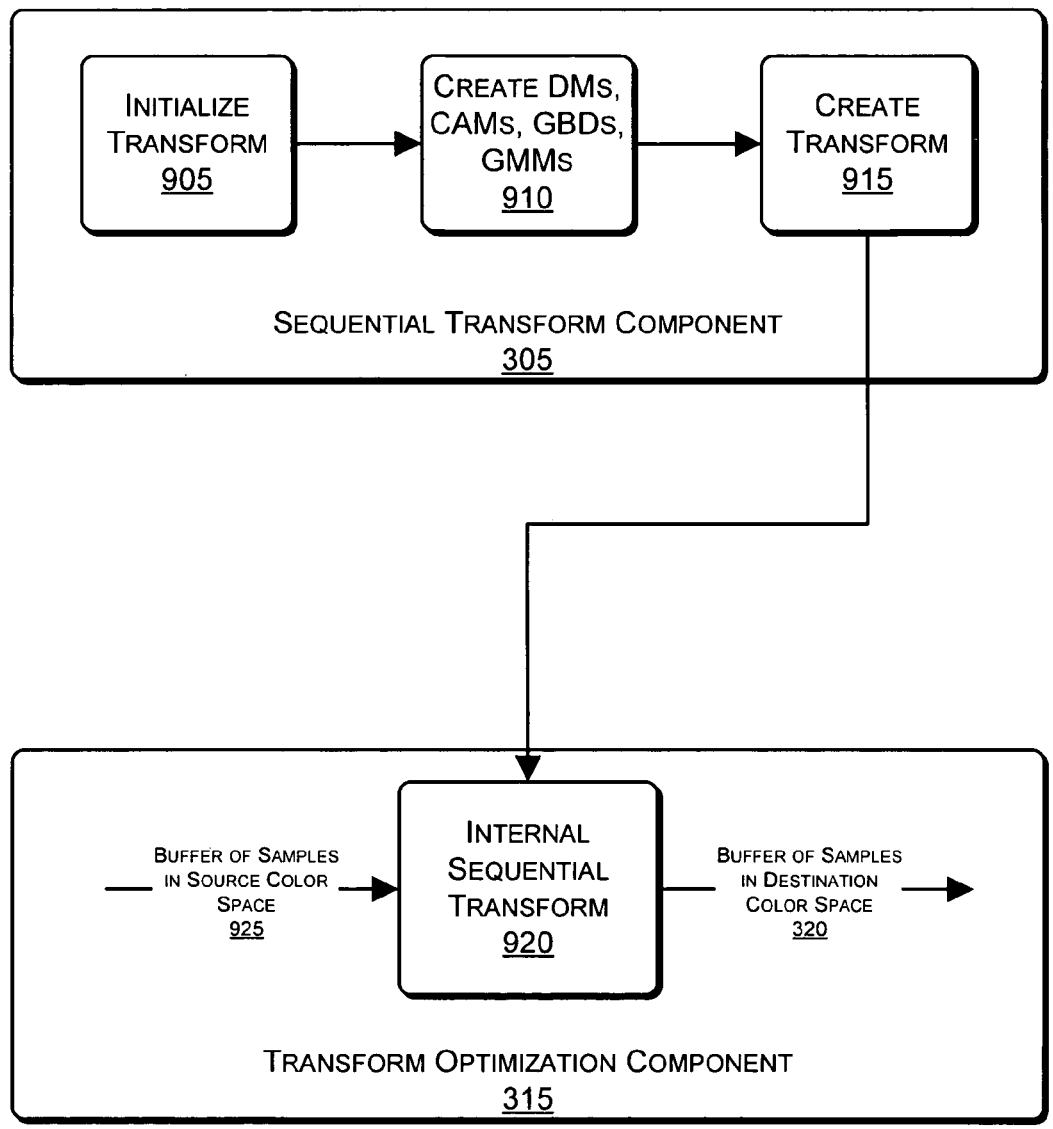
FIG. 9 is a block diagram illustrating further components and data flows relating to the sequential transform component shown in FIG. 3.

FIG. 9 illustrates further aspects of the sequential transform component 305 shown in FIG. 3, which creates the transforms 310. In block 905, the sequential transform component 305 initializes the transforms 310. In block 910, the sequential transform component 305 processes an array of profiles and an array of intents to create device models (DMs) 405, color appearance models (CAMs) 420, gamut boundary descriptions (GBDs) for use by the gamut boundary functions 435, and gamut mapping models (GMMs) 430.

The device models 405 can be initialized directly from DMPs. Thus, one device model 405 can be created for each DMP. The color appearance models 420 can be initialized directly from CAMPs. Thus, one color appearance model 420 can be created for each CAMP. The gamut boundary descriptions (GBDs) can be initialized from objects instantiating representations of the device model profile and the CAMP Thus, a sequence of profiles can correspond to a sequence of GBDs. Gamut mapping models 430 can be initialized from two gamut boundaries and a rendering intent. Each entry in the rendering intent array can reference a GMM 430.

The sequential transform component 305 traverses the sequence of GBDs in pairs; within each pair, the first acts as "source" and the second as "destination". The destination GBD of one pair will act as the source GBD of the succeeding pair. All but the very first and the very last elements in the sequence will serve as first destination and then source for the corresponding GMM. Thus, the sequential transform component 305 ends up with the very first DM-CAM pair, the very last DM-CAM pair, and an array of gamut mapping models for all the transformations in between.

Once all the profiles and intents have been properly processed, and the intermediate objects initialized, the transform is created in block 915, and in block 920, the source color space is sampled to produce a representative buffer 925 of samples. The transform optimization component 315 then runs this buffer 925 through the sequential transform component 305 to create a single, optimized look-up table 320 of mappings between source colors and resulting destination colors.

Figure 10:
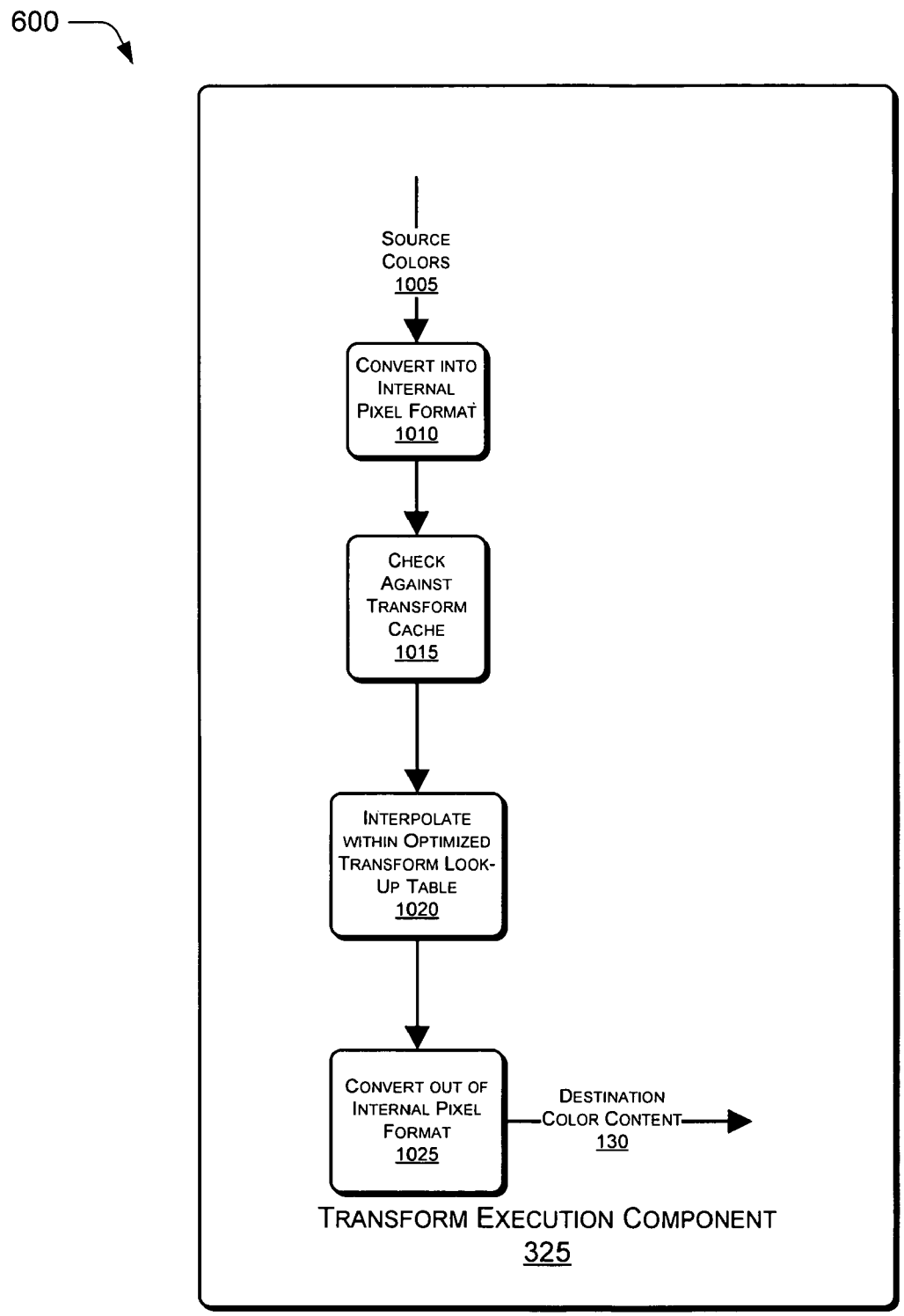
FIG. 10 is a block diagram illustrating further components and data flows relating to a transform execution component shown in FIG. 3.

FIG. 10 depicts aspects of the transform execution component 325 shown in FIG. 3. The transform execution component 325 functions translate, for example, an array of colors 1005 from the source color space to the destination color space as defined by a color transform. In block 1010, the transform execution component 325 calls pixel formatting support code to convert the incoming raster or vector color data into an internal transform format. An illustrative internal transform format is 32 bit per color channel floating point, with range normalized to [0.0, 0.1]. In block 1015, the transform execution component 325 checks against an array of cached colors to enable immediate matching of commonly transformed colors. In block 1020, if the source colors cannot be matched from the cache, the optimized transform look-up table 320 is interpolated to find the closest match. In block 1025, the destination color content 130 is converted back out of the native pixel format. Both bitmap and vector color data can be supported by the CITE 120.

Figure 11:
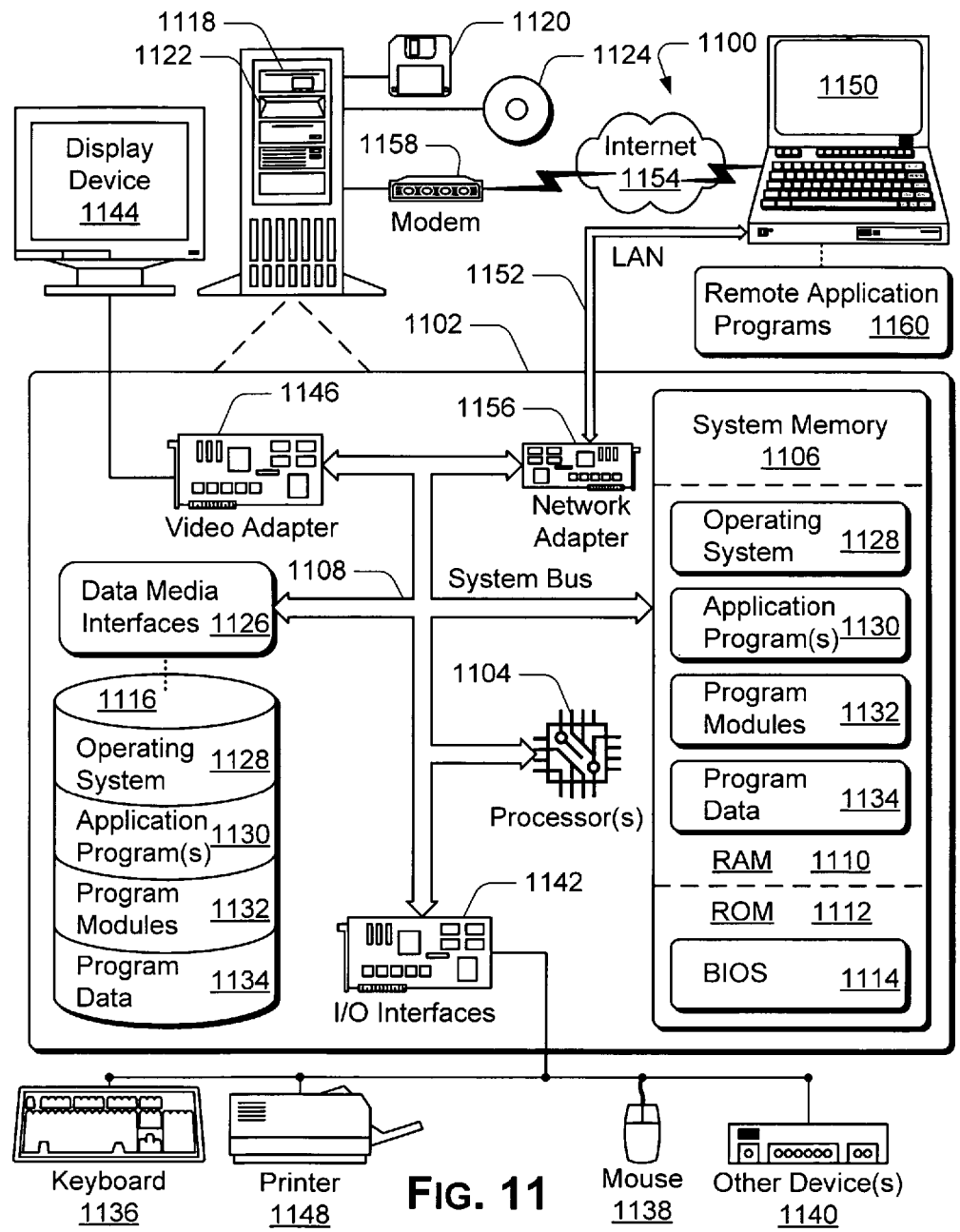
FIG. 11 illustrates an exemplary computing environment within which color management, as well as the computing, network, and system architectures described herein, can be either fully or partially implemented.

FIG. 11 illustrates an exemplary computing environment 100 within which declarative queries for sensor networks, as well as the computing, network, and system architectures described herein, can be either fully or partially implemented. Exemplary computing environment 1100 is only one example of a computing system and is not intended to suggest any limitation as to the scope of use or functionality of the architectures. Neither should the computing environment 1100 be interpreted as having any dependency or requirement relating to any one or combination of components illustrated in the exemplary computing environment 1100.

The computer and network architectures in computing environment 1100 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 1100 includes a general-purpose computing system in the form of a computing device 1102. The components of computing device 1102 can include, but are not limited to, one or more processors 1104 (e.g., any of microprocessors, controllers, and the like), a system memory 1106, and a system bus 1108 that couples the various system components. The one or more processors 1104 process various computer executable instructions to control the operation of computing device 1102 and to communicate with other electronic and computing devices. The system bus 1108 represents any number of several types of bus structures, including a memory bus or memory controller, a peripheral bus, an accelerated graphics port, and a processor or local bus using any of a variety of bus architectures. Taken in whole or in part, the computing device 1102 may be suitable for implementing the CITE 120.

Computing environment 1100 includes a variety of computer readable media which can be any media that is accessible by computing device 1102 and includes both volatile and non-volatile media, removable and non-removable media. The system memory 1106 includes computer readable media in the form of volatile memory, such as random access memory (RAM) 1110, and/or non-volatile memory, such as read only memory (ROM) 1112. A basic input/output system (BIOS) 1114 maintains the basic routines that facilitate information transfer between components within computing device 1102, such as during start-up, and is stored in ROM 1112. RAM 1110 typically contains data and/or program modules that are immediately accessible to and/or presently operated on by one or more of the processors 1104.

Computing device 1102 may include other removable/non-removable, volatile/non-volatile computer storage media. By way of example, a hard disk drive 1116 reads from and writes to a non-removable, non-volatile magnetic media (not shown), a magnetic disk drive 1118 reads from and writes to a removable, non-volatile magnetic disk 1120 (e.g., a "floppy disk"), and an optical disk drive 1122 reads from and/or writes to a removable, non-volatile optical disk 1124 such as a CD-ROM, digital versatile disk (DVD), or any other type of optical media. In this example, the hard disk drive 1116, magnetic disk drive 1118, and optical disk drive 1122 are each connected to the system bus 1108 by one or more data media interfaces 1126. The disk drives and associated computer readable media provide non-volatile storage of computer readable instructions, data structures, program modules, and other data for computing device 1102.

Any number of program modules can be stored on RAM 1110, ROM 1112, hard disk 1116, magnetic disk 1120, and/or optical disk 1124, including by way of example, an operating system 1128, one or more application programs 1130, other program modules 1132, and program data 1134. Each of such operating system 1128, application program(s) 1130, other program modules 1132, program data 1134, or any combination thereof, may include one or more embodiments of the systems and methods described herein.

Computing device 1102 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 1102 via any number of different input devices such as a keyboard 1136 and pointing device 1138 (e.g., a "mouse"). Other input devices 1140 (not shown specifically) may include a microphone, joystick, game pad, controller, satellite dish, serial port, scanner, and/or the like. These and other input devices are connected to the processors 1104 via input/output interfaces 1142 that are coupled to the system bus 1108, but may be connected by other interface and bus structures, such as a parallel port, game port, and/or a universal serial bus (USB).

A display device 1144 (or other type of monitor) can be connected to the system bus 1108 via an interface, such as a video adapter 1146. In addition to the display device 1144, other output peripheral devices can include components such as speakers (not shown) and a printer 1148, which can be connected to computing device 1102 via the input/output interfaces 1142.

Computing device 1102 can operate in a networked environment using logical connections to one or more remote computers, such as remote computing device 1150. By way of example, remote computing device 1150 can be a personal computer, portable computer, a server, a router, a network computer, a peer device or other common network node, and the like. The remote computing device 1150 is illustrated as a portable computer that can include any number and combination of the different components, elements, and features described herein relative to computing device 1102.

Logical connections between computing device 1102 and the remote computing device 1150 are depicted as a local area network (LAN) 1152 and a general wide area network (WAN) 1154. Such networking environments are commonplace in offices, enterprise-wide computer networks, intranets, and the Internet. When implemented in a LAN networking environment, the computing device 1102 is connected to a local network 1152 via a network interface or adapter 1156. When implemented in a WAN networking environment, the computing device 1102 typically includes a modem 1158 or other means for establishing communications over the wide area network 1154. The modem 1158 can be internal or external to computing device 1102, and can be connected to the system bus 1108 via the input/output interfaces 1142 or other appropriate mechanisms. The illustrated network connections are merely exemplary and other means of establishing communication link(s) between the computing devices 1102 and 1150 can be utilized.

In a networked environment, such as that illustrated with computing environment 1100, program modules depicted relative to the computing device 1102, or portions thereof, may be stored in a remote memory storage device. By way of example, remote application programs 1160 are maintained with a memory device of remote computing device 1150. For purposes of illustration, application programs and other executable program components, such as operating system 1128, are illustrated herein as discrete blocks, although it is recognized that such programs and components reside at various times in different storage components of the computing device 1102, and are executed by the one or more processors 1104 of the computing device 1102.

For convenience of understanding and discussion, but not limitation, the following list of definitions of certain terms used herein is provided:

CIEJCh: Cylindrical coordinates of the color appearance model CIECAM02; they are viewing-condition-independent. Rectangular CIEJab values are derived as a=C cos h and b=C sin h.

CIEXYZ: A mathematical color space produced by the CIE (Commission Internationale de l'Eclairage) that describes color in terms of synthetic primaries X, Y and Z. The primaries are imaginary mathematical constructs that model our eyes' response to different wavelengths of light. CIEXYZ, often called tristimulus values, are device-independent, but viewing-condition-dependent. WCS uses the color space based on XYZ determined for the CIE Standard 1931 Colorimetric Observer (the 2 degree observer), relative to D50 illuminant, and measured with 0/45 or 45/0 geometry, for reflecting media.

Color Appearance Model: Color appearance models are algorithms which predict the perception of colors under different lighting conditions and backgrounds. CIECAM02 transforms physical measurements of the color stimulus and viewing environment into relative perceptual attributes, lightness (J), chroma (C) and hue (h).

Color Appearance Model Profile: A collection of measurements that provide the parametric viewing condition data appropriate to transform colors between the CIEXYZ colorimetric space and a perceptually uniform color appearance space.

Color Space: A system that describes color, either in terms of physical samples (e.g. Pantone color space), or by numerical values in a 3-dimensional coordinate model (e.g. sRGB color space, based on the RGB model). Color spaces have a specified gamut or range of colors.

Color Target: Also called color measurement target or simply measurement target. A set of color samples used to empirically evaluate device color reproduction for capture and print devices.

Targets used for capture devices can be physical samples of colored patches with known CIEXYZ values. These targets can be captured into a bitmap using the capture device. The resulting device RGB values in the bitmap can be used in conjunction with the table of known XYZ values to characterize the capture device. A common standard is the GretagMacbeth Color Checker.

Targets used for printer devices can be electronic files containing patches of known CMYK input. The printer output of these files can be measured to obtain the corresponding CIEXYZ or CIELab values of the patches. The printer device can then be characterized.

Device Model: Device models are algorithms which translate the native color space of a device into a standard device-independent color space such as CIEXYZ. This translation is derived statistically from measurement data, and expressed either using look-up tables or mathematical equations.

Device Model Profile: A collection of measurements that provide the parametric device data appropriate to transform colors between the native device state and CIEXYZ colorimetric space.

Gamut: The full range of colors that are available in a color space, or can be generated by a specific device.

Gamut Mapping Model: Gamut mapping models are algorithms which convert the coordinates of one color space into another. A color is said to be "out of gamut" when its position in one device's color space cannot be directly translated into another device's color space. Rendering intents (gamut mapping algorithms) prescribe methods of handling out-of-gamut colors.

CIECAM02: "A Colour Appearance Model for Colour Management Systems: CIECAM02", Publication CIE 159: 2004, ISBN 3901906290

Although embodiments of declarative queries of sensor networks have been described in language specific to structural features and/or methods, it is to be understood that the subject of the appended claims is not necessarily limited to the specific features or methods described. Rather, the specific features and methods are disclosed as exemplary implementations of declarative queries of sensor networks.

The invention claimed is:

1. A system comprising:
a processor coupled to computer-readable storage media having computer-readable instructions embodied therein, the computer-readable instructions adapted to be executed by the processor to implement a color infrastructure transformation engine including at least:
a sequential transform component adapted to:
receive source color content of a first media type from a source device to create a transform to facilitate translating the source color content to destination color content for rendering on a destination device;
receive first pixel values of the source color content defined in a source color space associated with the source device;
translate the received first pixel values from the source color space associated with the source device to second pixel values defined in a device-independent and viewing-condition-independent intermediate color space;
determine gamut mapping between the source color space and the destination color space; and
translate the second pixel values from the device-independent and viewing-condition-independent intermediate color space into third pixel values defined in the color space of the destination device;
a transform optimization component adapted to create an optimized transform table of mappings between source colors and resulting destination colors based on the transform; and
a transform execution component adapted to generate the destination color content by translating an array of colors from the source color space to the destination color space by checking the array of colors from the source color space with an array of cached colors to enable immediate matching of commonly transformed colors, wherein, when the array of colors from the source color space cannot be matched from the cache, the optimized transform table is used to find a closest match for generating the destination color content.

2. The system according to claim 1, wherein the sequential transform component includes a forward device model that is adapted to receive the first pixel values in the source color space associated with the source device.

3. The system according to claim 2, wherein the forward device model is adapted to receive data from a device model profile that specifies characteristics of at least one of the source device and the destination device.

4. The system according to claim 3, wherein the forward device model is adapted to receive data from a device model profile that specifies at least one of the following parameters for at least one of the source device and the destination device: a minimum colorant value, a maximum colorant value, a maximum range limit, and a minimum range limit.

5. The system according to claim 1, wherein the sequential transform component includes a forward color appearance model that is adapted to compensate for viewing conditions under which at least one of the source color content and the destination color content are perceived.

6. The system according to claim 1, wherein the sequential transform component is adapted to receive at least further source color content and to create at least a further transform to facilitate mapping the further source color content to destination color content.

7. The system according to claim 1, wherein the further source color content and the source color content represent different media types.

8. The system according to claim 1, wherein the sequential transform component is adapted to receive at least further source color content and to create at least a further transform to facilitate mapping the further source color content to at least further destination color content.

9. The system according to claim 8, wherein the further destination color content and the destination color content represent different media types.

10. The system according to claim 1 wherein the transform optimization component creates the optimized transform table by sampling the source color space to produce a representative buffer of samples and applying the transform to the representative buffer to create the optimized transform table.

11. A system comprising:
a processor coupled to computer-readable storage media having computer-readable instructions embodied therein, the computer-readable instructions adapted to be executed by the processor to implement a color infrastructure transformation engine including at least:
a sequential transform component adapted to receive source color content of a first media type from a source device to create a transform to facilitate mapping the source color content to destination color content for rendering on a destination device;
wherein the sequential transform component comprises a forward device model that is adapted to receive first pixel values of the source color content defined in a source color space associated with the source device, wherein the forward device model translates the received first pixel values from the source color space associated with the source device to second pixel values in a device-independent color space;
wherein the sequential transform component further comprises a forward color appearance model that is adapted to compensate for viewing conditions under which at least one of the source color content and the destination color content are perceived, wherein the forward color appearance model translates the second pixel values into third pixel values in a device-independent and viewing-condition-independent intermediate color space;
wherein the sequential transform component further comprises a gamut mapping model that is adapted to receive the third pixel values and produce fourth pixel values that are mapped to a gamut of a destination color space of the destination device;
wherein the sequential transform component further comprises an inverse color appearance model that is adapted to translate the forth pixel values to fifth pixel values in the device-independent color space;
wherein the sequential transform component further comprises an inverse color appearance model that is adapted to translate the fifth pixel values from the device-independent color space into sixth pixel values in the color space of the destination device;

a transform optimization component adapted to receive the transform and to create an optimized transform table of mappings between source colors and resulting destination colors based on the transform by sampling the source color space to create a representative buffer of samples and run the buffer of samples through the sequential transform component to create the optimized transform table of mappings between source colors and resulting destination colors; and a transform execution component adapted to receive the optimized transform table and to generate the destination color content by translating an array of colors from the source color space to the destination color space, wherein the transform execution component checks the array of colors from the source color space with an array of cached colors to enable immediate matching of commonly transformed colors, wherein, when the array of colors from the source color space cannot be matched from the cache, the optimized transform table is interpolated to find a closest match for generating the destination color content for delivery to the destination device for rendering the destination color content on the destination device as composited content.

12. The system according to claim 11, wherein the forward device model is adapted to receive data from a device model profile that relates colors supported by a particular device to colors perceived by the human visual system, wherein the device model profile specifies at least one of the following parameters for the source device and a destination device: a minimum colorant value, a maximum colorant value, a maximum range limit, and a minimum range limit.

13. The system according to claim 11, wherein the transform created by the sequential transform component maps the source color content into the device-independent and viewing-condition-independent intermediate color space that comprises a gamma parameter that enables application of linear mathematical operations to the intermediate color space.

14. A method implemented by a processor executing computer-executable instructions stored in computer-readable storage media, the method comprising:

receiving source color content of a first media type from a source device to create a transform to facilitate translating the source color content to destination color content for rendering on a destination device;

receiving first pixel values of the source color content defined in a source color space associated with the source device;

translating the received first pixel values from the source color space associated with the source device to second pixel values defined in a device-independent and viewing-condition-independent intermediate color space;

determining gamut mapping between the source color space and the destination color space;

translating the second pixel values from the device-independent and viewing-condition-independent intermediate color space into third pixel values defined in the color space of the destination device;

creating, by the processor, an optimized transform table of mappings between source colors and resulting destination colors based on the transform; and generating, by the processor, the destination color content by translating an array of colors from the source color space to the destination color space by checking the array of colors from the source color space with an array of cached colors to enable immediate matching of commonly transformed colors, wherein, when the array of colors from the source color space cannot be matched from the cache, the optimized transform table is used to find a closest match for generating the destination color content.

15. The method according to claim 14, wherein creating the optimized transform table of mappings between source colors and resulting destination colors based on the transform further comprises:

sampling the source color space to create a representative buffer of samples; and running the buffer of samples through the sequential transform component to create the optimized transform table of mappings between source colors and resulting destination colors.

16. The method according to claim 14, wherein translating the received first pixel values from the source color space associated with the source device to second pixel values defined in a device-independent and viewing-condition-independent intermediate color space further comprises translating the first pixel values from the source color space associated with the source device to pixel values in a device-independent color space, wherein the device-independent color space is a CIEXYZ color space.

17. The method according to claim 16, wherein translating the received first pixel values from the source color space associated with the source device to second pixel values defined in a device-independent and viewing-condition-independent intermediate color space further comprises translating the pixel values in the device-independent CIEXYZ color space to the device-independent and viewing-condition-independent intermediate color space.

18. The method according to claim 14, wherein the first source color content in the first media type is a different media type from a second media type of the destination color content.

19. The method according to claim 14, wherein the source device is a different type of device than the destination device.

* * * * *